United States Patent [19]

Susnjara

[11] Patent Number: 5,198,819
[45] Date of Patent: Mar. 30, 1993

[54] WEATHER RADAR DISPLAY SYSTEM

[75] Inventor: Kenneth J. Susnjara, Santa Claus, Ind.

[73] Assignee: Thermwood Corporation, Dale, Ind.

[21] Appl. No.: 844,183

[22] Filed: Mar. 2, 1992

[51] Int. Cl.$^5$ .......................... G01S 13/95; G01S 7/20
[52] U.S. Cl. ........................................ 342/26; 342/58; 342/180; 342/181
[58] Field of Search .................... 342/26, 58, 176, 180, 342/181

[56] References Cited

U.S. PATENT DOCUMENTS

| | | | |
|---|---|---|---|
| 3,044,058 | 7/1962 | Harris | 342/180 |
| 3,154,636 | 10/1964 | Schwertz | 342/180 |
| 3,333,263 | 7/1967 | Kazakevicius et al. | 342/180 |
| 3,366,951 | 1/1968 | Lhermitte et al. | 342/180 X |
| 3,781,878 | 12/1973 | Kirkpatrick | 342/26 |
| 3,792,423 | 2/1976 | Becker et al. | 342/180 X |
| 4,092,644 | 5/1978 | Hodge | 342/26 |
| 4,249,174 | 2/1981 | Lucchi et al. | 342/26 |
| 4,684,951 | 8/1987 | Baumer | 342/26 X |
| 4,940,987 | 7/1990 | Frederick | 342/26 |

Primary Examiner—T. H. Tubbesing
Attorney, Agent, or Firm—Lalos & Keegan

[57] ABSTRACT

A weather radar display system and method for obtaining and storing radar return data for a plurality of horizontal and vertical sweeps, each horizontal sweep occurring at a different tilt angle and each vertical sweep occurring at a different azimuth angle. The radar return data is displayed as plan views in a plurality of separate display sections, each corresponding to a plurality of separate horizontal sweeps in one embodiment and to a plurality of separate vertical sweeps in a second embodiment. Radar return data in one display section (horizontal or vertical) is displayed with a variety of colors to represent precipitation intensity. Radar return data in remaining display section (horizontal or vertical) is displayed as a first color with edge returns displayed in second color to differentiate the remaining sections. Display sections partially overlap such that each subsequently displayed plan view is at least partially superimposed on the preceding view to give a three-dimensional image of the weather system.

53 Claims, 6 Drawing Sheets

WEATHER RADAR DISPLAY SYSTEM

FIELD OF THE INVENTION

The present invention relates to a radar system for detecting and displaying images of weather systems and more specifically to a weather radar system for use with aircraft.

BACKGROUND OF THE INVENTION

Weather radar systems for aircraft typically display radar echoes on a cathode ray tube (CRT) located on an operator's control panel. The weather image is represented in a plan view as the radar antenna sweeps back and forth horizontally. Precipitation intensity is indicated by the color of the radar echoes displayed. The effectiveness of such weather radar systems is limited by the interpretive skill of the operator.

Most systems have the capability to change the position of the radar antenna so that it points up or down. This tilt angle manipulation provides the operator with different views along different horizontal planes through the weather system ahead. Only one horizontal plane or view is displayed at any one time and it is important for the operator to select the correct tilt angle to get an accurate picture of the weather system. For example, the tilt angle of the radar search beam with respect to the aircraft must be such that it intersects the storm below the freezing level since frozen precipitation is a poor reflector of radar energy, while water is a good reflector. If the beam intersects above the freezing level, the storm will be displayed as less severe than it actually is. Thus, some level of conscious effort is required to manipulate the tilt control and interpret the display.

To get a better image of the weather system, or at least to obtain more information about it, operators typically will stop the horizontal scan of the radar antenna and will use the tilt control to scan vertically up and down. Although this provides a vertical image of the storm it does so at only one azimuth angle. U.S. Pat. No. 4,940,987 combines the horizontal scan and vertical scan on the control panel display so that an operator can view both images simultaneously. However, only one horizontal scan or "slice" of the weather system is displayed at one time and only one vertical slice is displayed at one time. Thus, the operator never gets a complete picture. The effectiveness of the system still depends on the operator's skill in selecting the appropriate tilt angle or azimuth angle and/or being able to recall previous images of other slices of the weather system image.

In addition, pilots often need information about weather that is beyond the range of their onboard radar. Currently the pilot must call a flight service station for a verbal report of enroute weather. This verbal communication could be unreliable because of the chance that the weather reporter can be misunderstood. The present invention serves to overcome such difficulty of weather interpretation by presenting the pilot with an accurate display of weather information obtained from independent remotely-located radar station which may be located beyond the range of the pilot's onboard radar.

SUMMARY OF THE INVENTION

It is an object of the present invention to provide a weather radar display system in which a more extensive picture of an approaching weather system is displayed.

Another object of the present invention is to display a plurality of horizontal plan view images simultaneously on a single display, partially superimposed on each other to present a three-dimensional image of the weather system, with each plan view representing a slice of the weather system scanning area at a selected tilt angle.

A further object of the invention is to display a plurality of vertical plan view images simultaneously on a single display, partially superimposed on each other to present a three-dimensional image of the weather system, with each plan view representing a slice of the weather system scanning area at a selected azimuth angle.

A still further object of the invention is to provide a system for displaying such images in a selected sequence and with selected color discrimination to facilitate interpretation of the displayed image.

A still further object of the invention is to provide weather data to a pilot from regions beyond the effective range of an aircraft's onboard radar.

Another object of the invention is to provide a system for the retrieval, storage and transfer of weather data obtained from remote radar stations independent from an aircraft for display on the aircraft's onboard display system.

Under microprocessor control, the antenna is operated to sweep the radar beam back and forth horizontally at a plurality of tilt angles. Alternately, the antenna is operated to sweep the radar beam up and down vertically at a plurality of azimuth angles. The radar return data is stored in memory with individual memory sections dedicated to individual horizontal and vertical slices of the weather image. To display a complete picture of the weather system, the horizontal or vertical display "slices" are read from memory and displayed in sequence. As an example, the horizontal plan view image representing the bottom of the weather system is first read and displayed. Then, the next higher horizontal plan view image is read and displayed in a CRT display area directly above and partially overlapping the first. The CRT display area may be logically divided into ten distinct areas, each one above and partially overlapping the other, to display ten horizontal slices, each at a different level. In this example, when the second horizontal scan is displayed, the first scan image is modified so that all return radar data for that image is the same color (e.g. light green). The edge of the image is made a different color or different shade (e.g. darker green) to differentiate one level from another. The top image will always show the traditional variety of colors to depict precipitation intensity. Once the entire CRT display area is filled with all ten horizontal plan views, the process is reversed to remove each top most image in sequence. The plan views are displayed quickly so that the effect is one of a horizontal plane oscillating up and down, and appearing as a three-dimensional image of the storm system. Alternately, vertical plan view images are displayed from left to right or right to left in the same manner as the up/down display of the horizontal scans.

A network system for providing a pilot with weather information obtained from an independent, remote radar station also is disclosed. In this embodiment weather data is obtained from the independent radar station which performs the radar sweep functions and accumulates data regarding a weather pattern. This radar information is then transmitted to a pilot for display.

In capturing the aircraft-independent radar data, the radar station performs a series of vertical and/or horizontal sweeps of an atmospheric space to gather data. The data can then be relayed to a nearby transceiver station. The weather information is then transferred to an aircraft or to a second transceiver station via radio waves or ground link. In this embodiment, the independent radar station and transceiver stations may be ground based, sea based, air based or satellite based. Furthermore, this embodiment contemplates intermediate transceiver stations for longer range broadcasts.

These and other objects and advantages will be apparent from the following detailed description and accompanying drawings.

DETAILED DESCRIPTION

Figure 1:
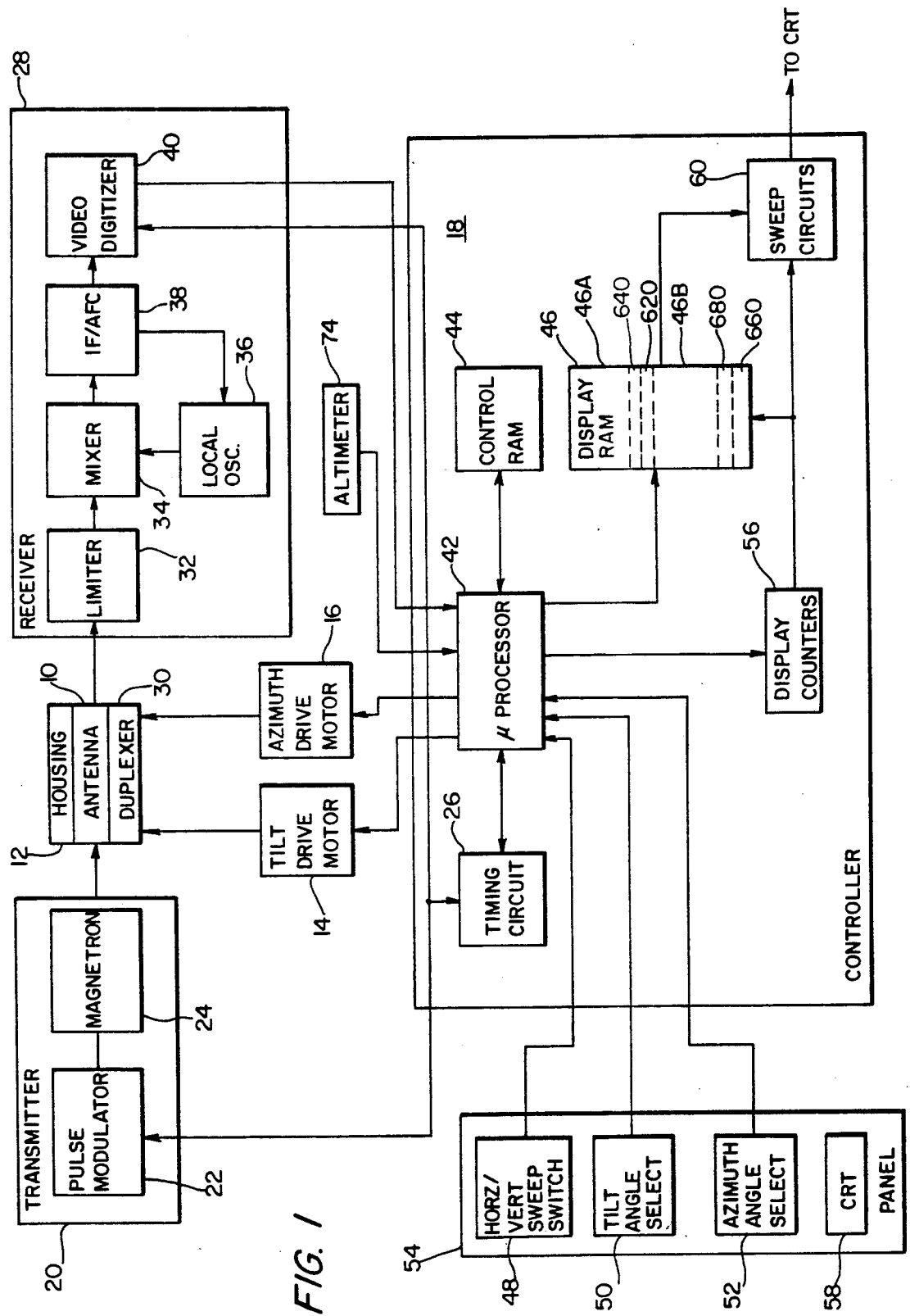
FIG. 1 is a block diagram of a weather radar display system of the present invention.

Referring to FIG. 1, an embodiment of the system utilizes a suitable radar antenna 10, such as a flat plate phased-array antenna. Antenna 10 is conventionally mounted in or to housing 12 (e.g. in an aircraft or ground station) to provide rotational movement of the antenna in a horizontal plane (azimuth) to scan from side to side. Antenna 10 is also mounted to provide tilting movement in a vertical plane (elevation) to change the tilt angle of the horizontal scan. Further, the antenna can be controlled to rotate in a vertical plane to provide a top to bottom scan. The horizontal direction (azimuth angle) of the antenna is fixed during a vertical scan but can be changed by an incremental amount for a vertical scan in a new direction. Movement of the antenna 10 is effected by tilt drive motor 14 and azimuth drive motor 16 under control of controller 18.

The antenna 10 is connected to transmitter 20, which generates pulses of radio waves (microwave energy) to the antenna. The antenna directs the pulse in a cone-shaped beam. Typically, this beam is about 8 degrees wide for a 12 inch antenna and 10 degrees wide for a 10 inch antenna.

The transmitter 20 comprises a pulse modulator 22 and magnetron 24. The modulator 22 may be, for example, a line type modulator with a 3.75 microsecond pulse. When the system is operating, modulator 22 will receive triggering pulses at a given pulse repetition from the timing circuit 26 of controller 18, as is conventional. The magnetron 24, which may be a positive anode type, for example, is excited by the pulse modulator 22 (e.g. through a transformer circuit) to produce an RF pulse, e.g. a 7.5 KW, 9375±30 MHz RF pulse of 3.75 microsecond duration.

Each time a pulse is transmitted by transmitter 20 and directed outwardly by antenna 10, the transmitter turns off and the receiver 28 begins receiving return echoes. The duplexer 30, which is an integral part of the antenna (used for both transmitting and receiving), is a conventional circuit that isolates the receiver 28 from transmitter 20. Duplexer 30 controls the flow of electrical signals to the receiver 28, permitting signal flow in the receive mode and preventing signal flow in the transmit mode. As protection for receiver 28, a limiter 32 (e.g. gas tube followed by a solid state device) is provided to limit the energy that can pass through while the transmitter is active.

The timing of the transmitter 20 and receiver 28 is synchronized so that once a pulse has been sent out, the transmitter 20 waits a sufficient time before sending out a subsequent pulse to enable the receiver to detect return pulses. The transmitted pulse will return only if it strikes objects that are capable of reflecting it.

Receiver 28 includes conventional mixer 34 that combines the received signal from antenna 10 with the output of local oscillator 36 to produce a 30 MHz (for example) intermediate frequency (IF). The local oscillator 36 produces signals at a nominal frequency that differs from the magnetron 24 frequency by a fixed value. For example, magnetron 24 may produce radio frequency signals at 9345 MHz and local oscillator 36 may produce a nominal frequency of 9375 MHz, whereby mixer 34 produces a 30 MHz intermediate frequency (IF) that is applied to the IF/AFC circuit 38, which amplifies the signal and supplies it to the video digitizer 40.

The automatic frequency circuit (AFC) portion of circuit IF/AFC produces a correction signal that is applied to local oscillator 36 to control its output frequency such that the mixer output frequency is maintained (e.g. at 30 MHz) regardless of minor frequency variations in the output of magnetron 24. Video digitizer 40 converts the analog signal from the IF/AFC circuit 38 into a digital signal. Video digitizer 00 includes a conventional sensitivity time control (STC) circuit that, in accordance with timing signals received from timing circuit 26 of controller 18, adjusts the intensity of the digital return data to correct for a decrease in signal strength as a function of distance of the signal reflected back to antenna 10.

As is conventional, the corrected digital return data, including distance information, is supplied to the controller 18. Controller 18 includes a microprocessor 42, programmed to control the operation of the weather radar display system. A control or supervisory program is stored in control random-access-memory (RAM) 44. Microprocessor 42 is programmed, using conventional methods, to receive and store the digital radar return data, including distance information in memory, i.e.

display RAM 46. In the present invention, display RAM 46 is indexed or addressed to store radar return data from both horizontal and vertical sweeps. In one application of the present invention a horizontal sweep is obtained at a plurality (e.g. ten) of tilt angles. This application is selected by setting the sweep select switch 48 to the "horizontal" position. The horizontal/vertical (HORZ/VERT) sweep select switch 48, tilt angle select switch 50 and azimuth angle select switch 52 are each located on operator's control panel 54.

In the horizontal sweep application, the antenna sweeps horizontally and the digital return data is stored in a segment of the upper half 46A (for example) of display RAM 46. For horizontal sweeps, the memory is addressed as a function of the antenna position as it sweeps horizontally, as a function of antenna tilt position (from tilt angle select switch 50), and as a function of the distance information that identifies the distance from which the return data is received. Thus, at each memory address is stored data representing the radar return data (if any) received from each different position in space through which the antenna sweeps. This data may comprise four bits of information, e.g. three color bits and a range bit, which relates to display resolution, as is conventional. Display RAM 46 is addressed by display counters 56 to refresh CRT 58 and control the sweep circuits 60 by providing the retrace signals, as is conventional. CRT 58 is located on operator's control panel 54. For vertical sweeps, the memory is addressed as a function of antenna position as it sweeps vertically, as a function of antenna azimuth angle (from azimuth angle select switch 52), and as a function of distance information. The memory may be logically divided into two sections, an upper half 46A for horizontal scans and lower half 46B for vertical scans. This is implemented by allocating the most significant bit (MSB) of the memory address to reflect the HORZ/VERT sweep switch 48 position. In the HORZ position, the address MSB will be a logical 1, selecting the upper half of memory addresses, and in the VERT position the address MSB will be a logical 0, selecting the lower half of memory addresses.

Figure 2:
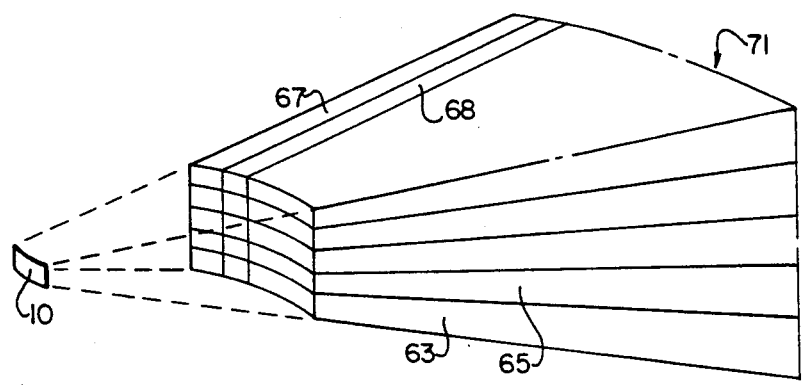
FIG. 2 is an illustration of the volume in space through which a radar antenna scans.

Any number of horizontal sweeps and vertical sweeps can be stored in memory. When the antenna is operated to sweep in a selected horizontal plane, the radar return data for the area scanned (e.g. volume 63 in FIG. 2) will be stored in a corresponding memory area (e.g. area 620 in FIG. 1) where memory locations have common address segments. Those common address segments are the most significant address bit and the address bits corresponding to tilt angle selected. When the antenna is operated to repeat the same horizontal scan (i.e. at the same tilt angle) the new return data (e.g. for volume 63) is written over the old data. The radar data resulting from a new horizontal sweep at a new tilt angle (e.g. from volume 65 in FIG. 2) will be written into a different memory area (e.g. area 640 in FIG. 1). FIG. 2 is an illustration showing the entire volume 71 in front of antenna 10 that can be scanned. Horizontal and vertical "slices" of the volume are represented (e.g. horizontal slices 63 and 65 and vertical slices 67 and 69) to illustrate the partial volumes that are scanned during specific horizontal and vertical sweeps. In an exemplary embodiment, the entire scan volume 71 shown in FIG. 2 is divided into ten horizontal and ten vertical slices.

Storage of radar return data for vertical sweeps is handled in the same manner. A vertical sweep through a first volume (e.g. volume 67 in FIG. 2) will result in return data that is stored in a corresponding memory area (e.g. area 660 in FIG. 1) where memory locations have two common address segments, the most significant address bit (set to logical zero for a vertical scan), and the address bits corresponding to the antenna azimuth angle selected. Repeat vertical sweeps at the same azimuth angle results in new data being written over old data from a previous sweep. As each vertical sweep at a new azimuth angle is performed, the radar return data is written into a memory area dedicated (i.e. partially addressed by) that azimuth angle. For example, radar return area 69 (FIG. 2) may be stored in corresponding memory area 680.

The data storage operation can best be explained with an example. Assuming the present invention is being utilized in an aircraft, the antenna can be tilted up or down relative to the horizon. If the aircraft is in level flight and the tilt (pitch angle) of the radar antenna is zero, the center of the cone-shaped beam from the antenna will be substantially level with the horizon. Negative and positive tilt angle selections will result in scans (sweeps) below and above horizontal level, respectively.

To develop a plurality of horizontal scans, the antenna tilt angle is initially selected either manually (via switch 50) or automatically by the controller 18 downwardly, e.g. to a tilt angle of −25 degrees. The controller 18 signals the azimuth drive motor 16 to sweep resulting in a horizontal sweep at a downward tilt angle. A horizontal sweep at this angle will result in radar return data (if any) being stored in display RAM 46 in a given memory area. All locations in this segment will have two address portions in common, the most significant bit (logical 1 for a horizontal scan) and the address segment that identifies a −25 degree tilt angle scan. After the first scan, the tilt angle can be selected either manually (via switch 50) or automatically by the controller 18 to a higher angle, e.g. −20 degrees. The return data is stored in a second memory area dedicated to a −20 degree tilt angle scan. This process is continued for a number of tilt angles (e.g. ten different angles— five below zero, zero, and four above zero).

Vertical scans are obtained in a similar manner. With a zero degree azimuth angle for the antenna, the cone-shaped beam of the antenna will be substantially aligned with the vertical plane that divides the center of the aircraft. Negative and positive azimuth angle selections will result in scans to the left and right, respectively, of the central vertical plane. A plurality of vertical scans are developed, for example, by initially directing the antenna either manually (via switch 52) or automatically by the controller 18 to the far left, e.g. azimuth angle of −25 degrees. A vertical sweep at this angle will result in radar return data (if any) being stored in display RAM 46 in a specified memory area. Similar to the horizontal sweeps, all memory locations in an area for a particular vertical sweep will have two address portions in common, the most significant bit (logical 0 for a vertical scan) and the address segment that identifies a −25 degree vertical scan. After the first scan, the azimuth angle can be selected either manually (via switch 52) or by the controller 18 at an angle closer to center, e.g., an azimuth angle of −20 degrees. The return data for this second scan is stored in a second memory area dedicated to a −20 degree azimuth angle. As with horizontal sweeps, a vertical sweep is made at a number of azimuth angles, e.g. ten different angles— five to the left of center, center (zero azimuth angle), and four to the right of center.

Figure 3:
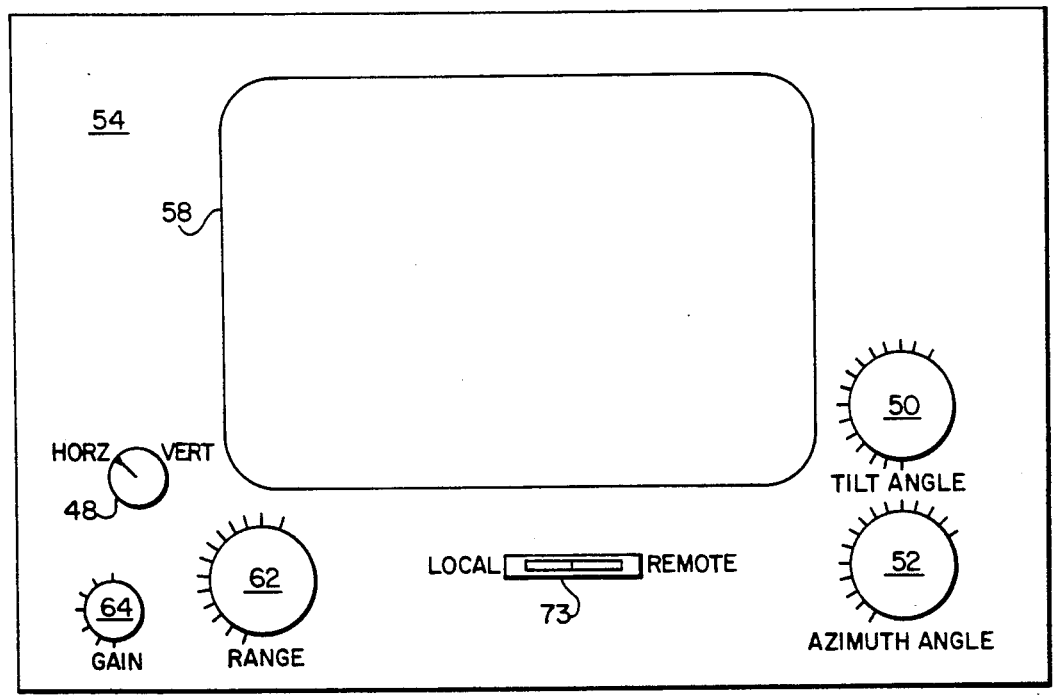
FIG. 3 shows the operator's control panel including the CRT display.

Once the system has ten horizontal and/or ten vertical sweeps in display RAM 46, the stored data can be read out and displayed on cathode ray tube (CRT) 58. In a conventional weather radar display system, only one horizontal sweep is displayed as a plan view image. However, the present invention permits a plurality of horizontal or vertical plan view images to be displayed sequentially and/or simultaneously, with each subsequent plan view image being at least partially superimposed on the previous image, with the resulting effect of a three-dimensional view of the weather system. Under control of microprocessor 42, the display counters 56 address the display RAM 46 to read its contents to refresh the CRT display and also refresh the memory. In one embodiment, the memory data representing the lowest horizontal scan (e.g. −25 degrees) is read from memory and displayed in a portion of the CRT 58 display area. FIG. 3 illustrates the operator's control panel 54 with CRT 58 (e.g. black matrix picture tube), tilt angle select rotary switch 50, azimuth angle select rotary switch 52, HORZ/VERT sweep switch 48, a range switch 62, and gain/brightness control dual-knob switch 64. The CRT display area may be logically divided into ten sections from bottom to top for horizontal sweep displays and left to right for vertical sweep displays. The logical CRT sections correspond to the logically divided data storage sections of display RAM 46.

Figure 4:
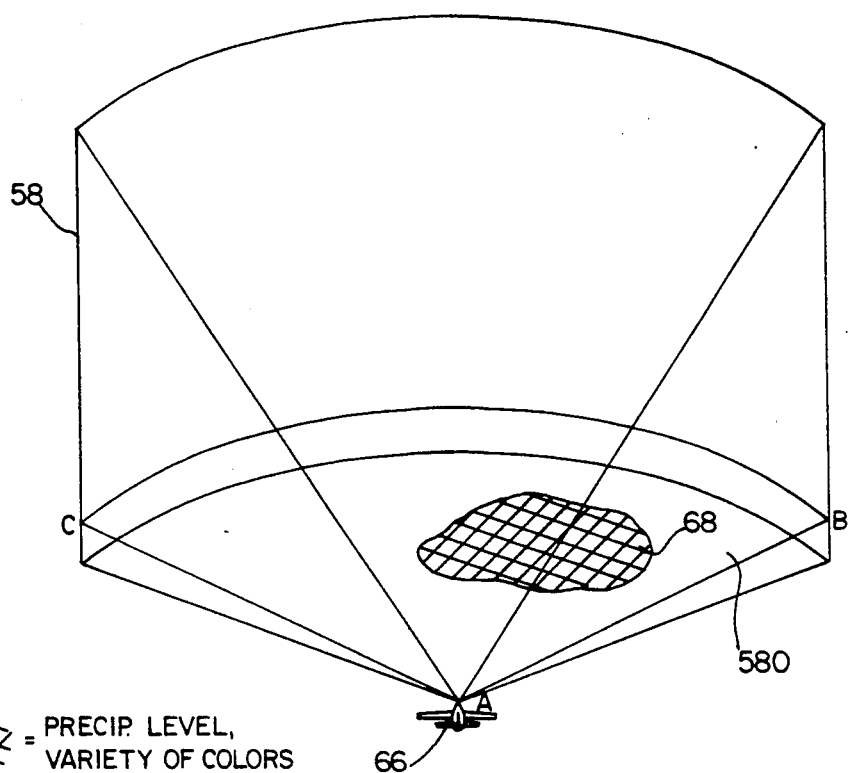
FIG. 4 illustrates the weather image as depicted on the CRT display with one horizontal radar sweep.

FIG. 4 illustrates the display image in CRT 58 for the first or lowest horizontal scan. The return data for the lowest scan (e.g. volume 62 in FIG. 2) stored in memory (e.g. area 620 in FIG. 1) is read from memory and displayed in the lowest CRT 58 area, e.g. area 580 (FIG. 4) defined by the points A, B and C. For reference, a small airplane 66 is displayed in the bottom center of CRT 58. This first weather "slice" 68 is displayed in a variety of colors to represent precipitation levels, as is conventional.

Figure 5:
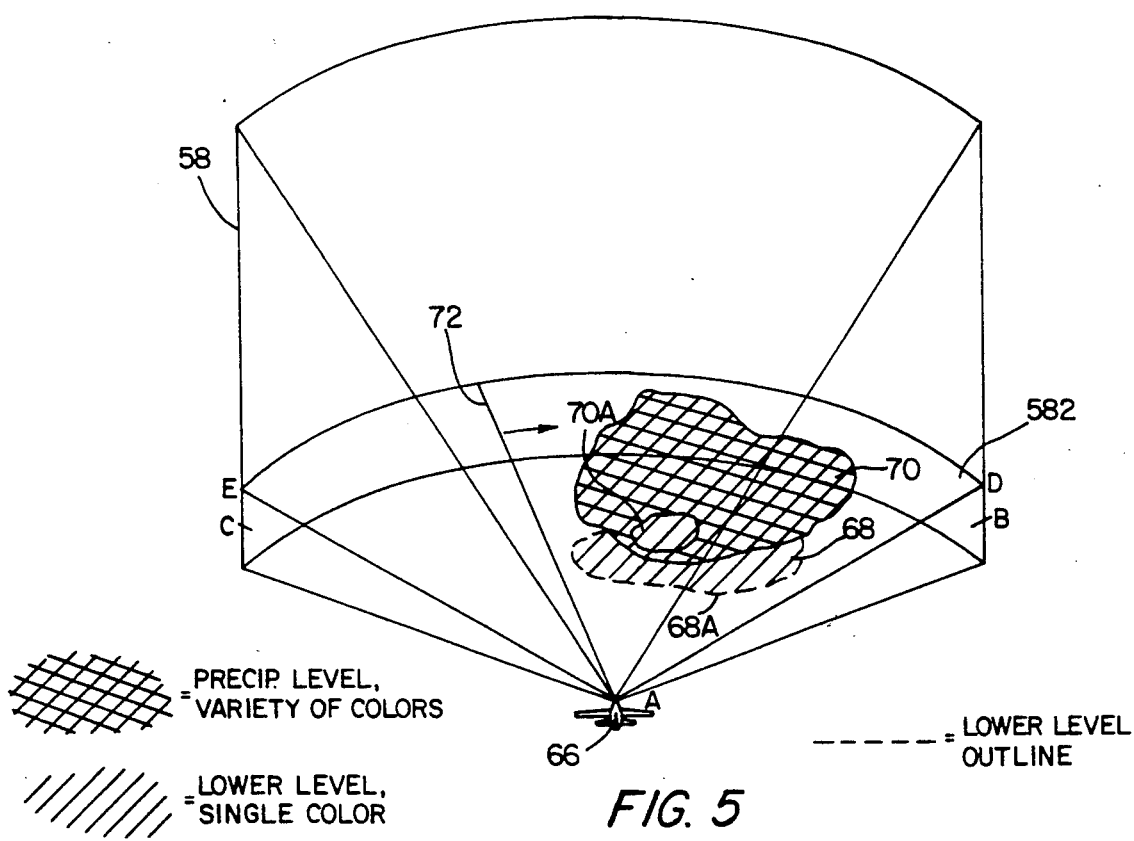
FIGS. 5, 6 nd 7 illustrate the weather image as depicted on the CRT display with two, three and four horizontal radar sweeps, respectively.

Next, the second horizontal sweep data is read from memory and displayed in the next display area, e.g. area 582 (FIG. 5) defined by points A, D and E. Area 582 (FIG. 5) overlaps area 580 (FIG. 4) such that the second weather slice 70 is superimposed on the first (68), but not completely. This feature gives the visual impression that the second slice is at a higher vertical level than the first, thereby giving a three-dimensional view of the weather picture (through two levels). For enhancement, as the sweep line (shown as 72 in FIG. 5) moves over the old image (e.g. image 68 in FIG. 5) it is changed to a single color (e.g. lisht green) and the edge 68A of the image is changed to another color or a different shade (e.g. dark green). The top image 70 is shown in a variety of colors to represent precipitation intensity. The lower image 68 will only be shown where it is not covered over by the partially superimposed upper image 70. Also, where no precipitation is detected or shown in the upper display image, the lower image (e.g. the light green image 68) will show through (e.g. as in area 70A in FIG. 5).

Figure 6:
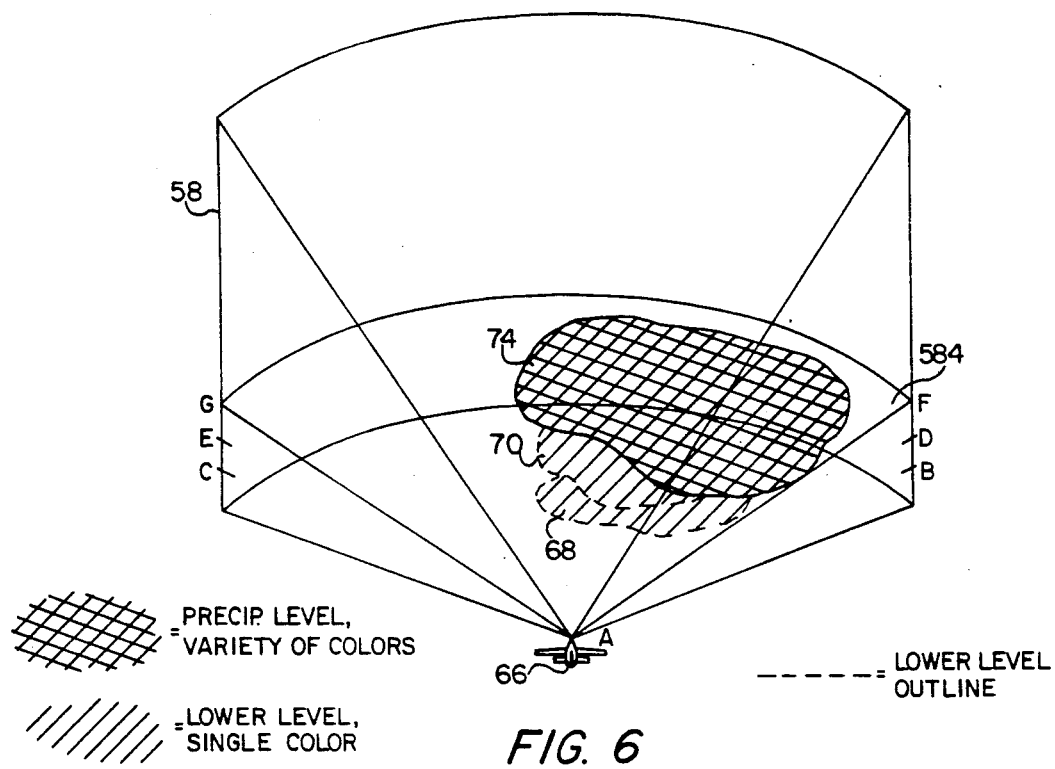

Next, the third horizontal sweep data is read from memory and displayed in the next display area, e.g. area 584 (FIG. 6) defined by points A, F and G. Once again, the upper area (i.e. 584 in FIG. 6) overlaps the lower area (i.e. 582 in FIG. 5) such that the third weather slice 74 is partially superimposed on the second (70). As this upper weather image is added, the lower images are displayed in a single color with the edges highlighted in a different color or shade, as described previously. The uppermost image will always be shown in a variety of colors to represent precipitation intensity.

Figure 7:
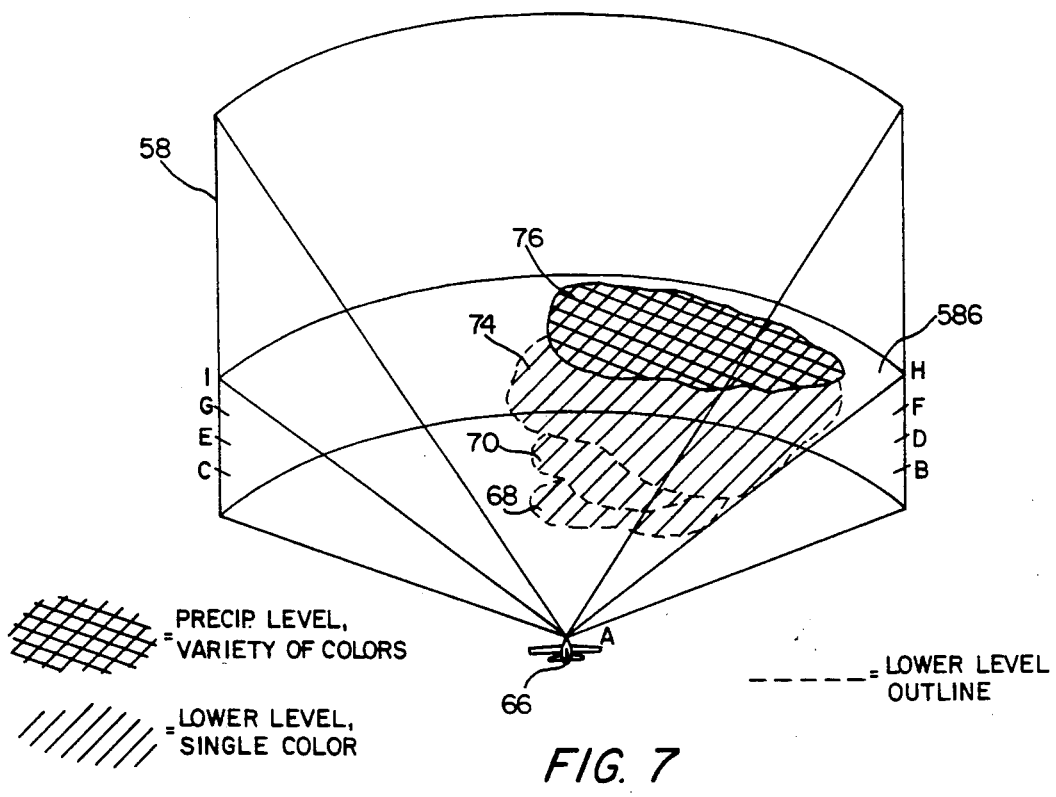

The entire display image (e.g. all ten sections) is filled by sequentially adding another horizontal sweep image (plan view) to the existing horizontal sweep images, i.e. a fourth (image 76, FIG. 7) displayed in area 586 (FIG. 7) is added to the first three images (68, 70, 74), and so on. Once the entire three-dimensional image is built, the process is reversed with the top plan view (i.e. the tenth) being removed with only the bottom nine displayed, then only the bottom eight, then seven, etc. Methods and software techniques for display and manipulation of CRT images are numerous and well known in the art and require no detailed explanation.

The effect of this display is to create the image of a horizontal plane that oscillates up and down. As the plane moves up, it builds an image of the weather picture (e.g. of a storm) with the top plane showing the precipitation intensity with various colors. The lower planes are shown in a single color with each plane edge highlighted in a different color or shade to differentiate one plane from another.

Figure 8:
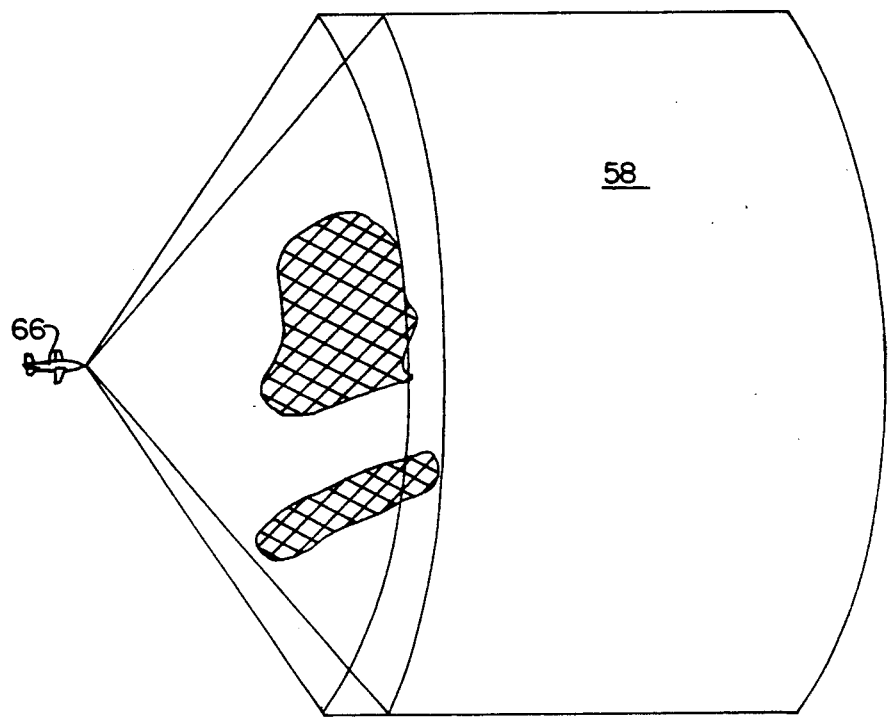
FIGS. 8, 9 and 10 illustrate the weather image as depicted on the CRT display with one, two and three vertical sweeps respectively.
Figure 9:
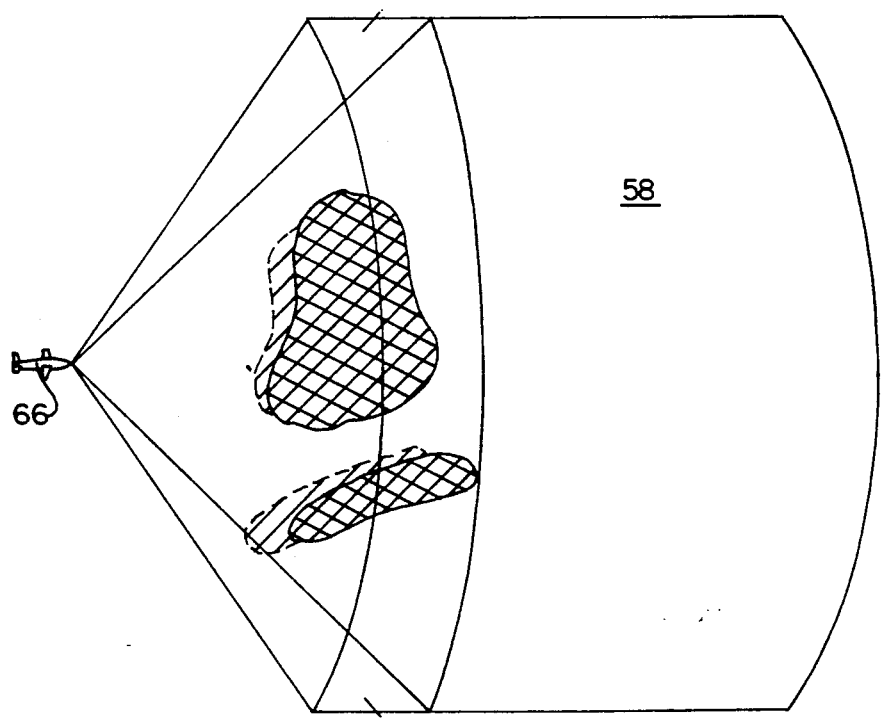
Figure 10:
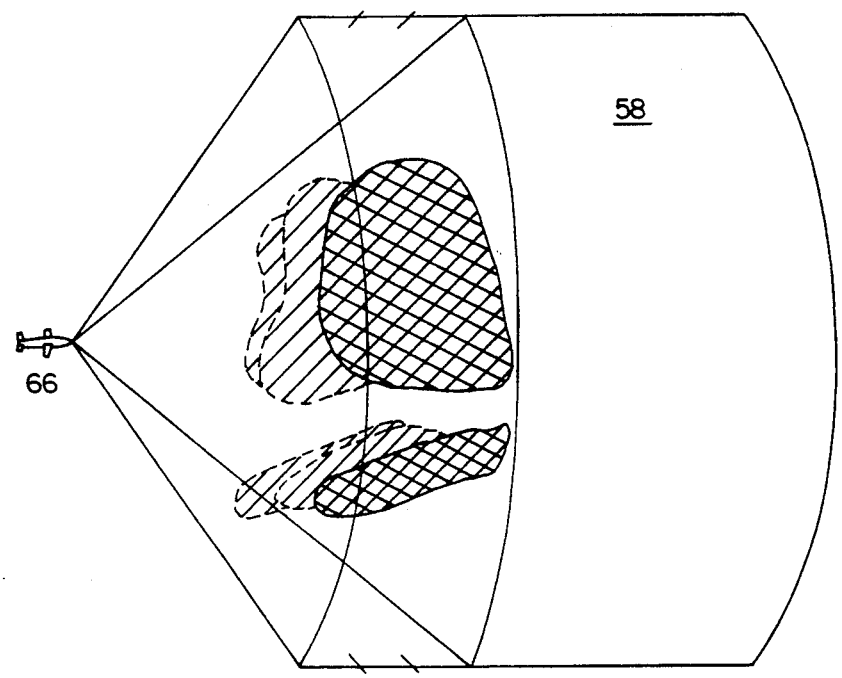

The same weather picture can be shown by displaying the results of vertical sweeps. The CRT 58 display area is again divided into sections but from left to right instead of top to bottom. FIGS. 8, 9 and 10 illustrate the display of one, two and three vertical plan views, respectively. The same process described above for horizontal sweeps is also applicable to vertical sweeps except the weather picture is built from left to right (or right to left) instead of from bottom to top.

Figure 11:
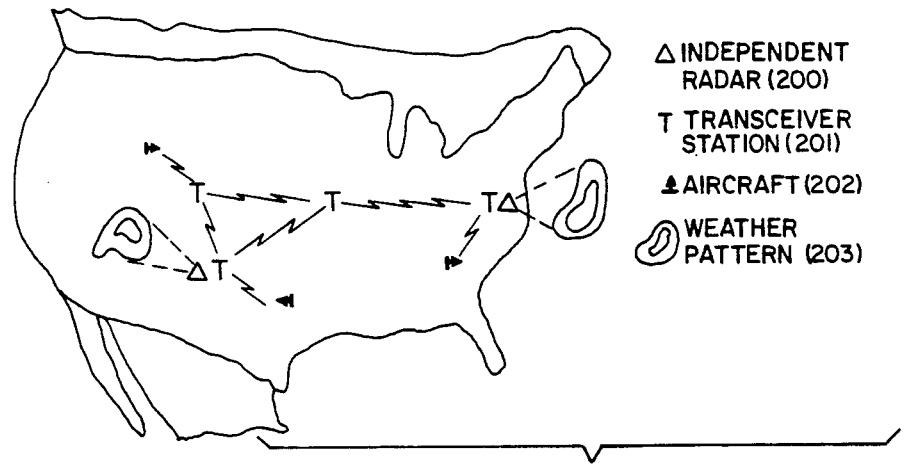
FIG. 11 shows a network system comprising two independent radar systems for gathering radar data, four transceiver stations for transmitting and receiving weather information and three aircraft for receiving weather information.
Figure 12:
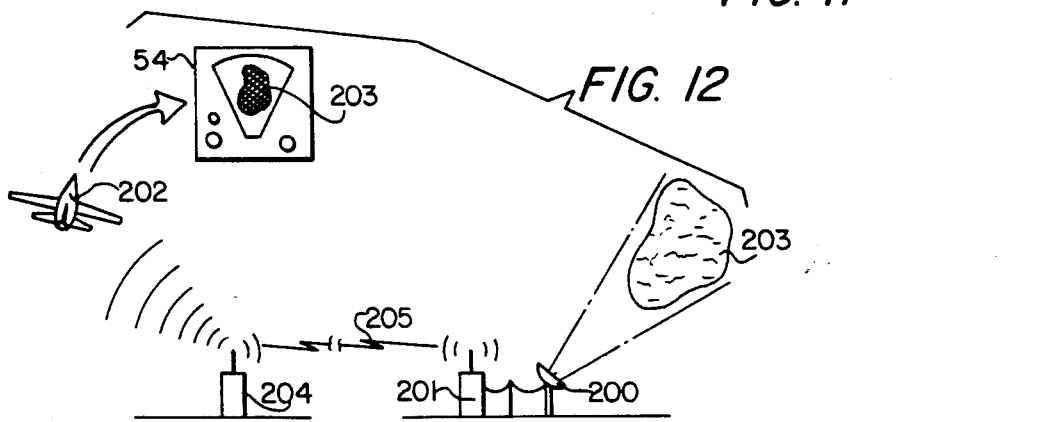
FIG. 12 shows a network system comprising an independent radar system for gathering radar data and transferring the data to a transceiver station where it is transmitted to a second transceiver station and then broadcast to an aircraft.

A further embodiment of the present invention comprises a network system for a weather radar display system involving airborne and airplane-independent weather detecting systems, each remotely located from one another. Referring to FIGS. 11 and 12, the network system comprises at least one independent (land or sea or air) radar station 200 and at least one transceiver station 201. Radar station 200 can be a conventional radar system or a radar data gathering system utilizing the invention described herein, i.e. a radar system capable of developing three dimensional radar images. FIG. 11 illustrates a network system employing two radar stations 200, four transceiver stations 201, and three user aircraft 202, which are remotely located from the independent radar station. FIG. 12 illustrates a radar station 200 in the process of gathering weather radar data, a transceiver 201 receiving the data from the radar station 200, a transceiver 201 transmitting the weather information to a second transceiver station 204 (e.g. via a radio link 205), the second transceiver station 204 receiving the weather information from the first transceiver 201 and transmitting the weather information to aircraft 202 for display and viewing by the aircraft's operator.

In operation, a ground-level radar station 200 performs scanning patterns (horizontal, vertical or a mixture thereof) which obtain radar return data of weather patterns 203 within the effective range of the ground-level radar. The ground-level radar system then stores the radar return data (i.e. in a conventional manner or as described herein) and transfers the data to a transceiver station 201. The weather information may then be transmitted to an aircraft directly, or to any other transceiver station for the purpose of relaying that weather information to a more remote aircraft. Referring to FIG. 12, the weather pattern 203 is scanned by the radar station 200. The weather data is then transferred to the transceiver 201 where it is stored. The weather information is then transmitted to a second transceiver 204. The second transceiver then transmits the weather information to an operator in aircraft 202. The operator can then observe the long-range weather pattern 203 on the display 54 of the weather radar display system as well as short range weather display pattern developed by the on-board radar system. Switch 73 (FIG. 3) on control panel 54 permits the operator to select for display the local weather picture developed by the on-board radar system or the remote weather picture developed by the independent radar system.

There are a number of intermediate steps that can be taken for the operator to properly identify the location of the weather patterns 203 received from remote stations 200. These intermediate steps of identification of a specific region of weather to be displayed and the steps of transferring information regarding the actual position of the weather pattern involve the currently available technologies such as LORAN (long range navigation) and GPS (global positioning system). Since LORAN and GPS systems are well known in the art.

Various modifications to the illustrative embodiments shown and described will be apparent to those having ordinary skill in the art. Although the present invention has been discussed primarily as an aircraft system, it will also find utility in ground stations and ships.

I claim:

1. A weather radar system comprising:
   an antenna for radiating pulses and for receiving returned pulses;
   a means for housing said antenna;
   means for rotating said antenna within said housing means in a horizontal direction for a horizontal radar sweep;
   means for tilting said antenna to reposition said antenna at a plurality of tilt angles;
   control means for controlling said rotating means and said tilting means to rotate said antenna for a first horizontal sweep at a first tilt angle, to tilt said antenna to a second tilt angle and to subsequently rotate said antenna for a second horizontal radar sweep at the second tilt angle;
   means for storing returned pulses from said first and second horizontal sweeps;
   said means for storing comprising a first memory section for storing returned pulses from said first horizontal sweep and a separate second memory section for storing returned pulses from said second horizontal sweep;
   display means for displaying said returned pulses stored in said first and second memory sections and wherein
   said display means comprises means for displaying a first portion representing said returned pulses stored in said first memory section and a second portion representing said returned pulses stored in said second memory section.

2. A system as in claim 1 wherein said control means includes means for controlling said display means to display said returned pulses stored in said first memory section as a first horizontal plan view and to subsequently display said returned pulses stored in said second memory section as a second horizontal plan view.

3. A system as in claim 2 wherein said control means includes means for controlling said display means to display said first and second plan views at the same time.

4. A system as in claim 3 wherein said display means comprises means for displaying said return pulses in said first horizontal plan view in a first color.

5. A system as in claim 4 wherein said display means comprises means for displaying edge return pulses in said first horizontal plan view in a second color different from said first color.

6. A system as in claim 3 wherein said display means comprises means for displaying said return pulses in said first horizontal plan view in a single color having a first shade.

7. A system as in claim 6 wherein said display means comprises means for displaying edge return pulses in said first horizontal plan view in a second shade different from said first shade.

8. A system as in claim 3 wherein said display means comprises means for displaying said return pulses in said second horizontal plan view in a variety of colors to represent precipitation intensity.

9. A system as in claim 2 wherein said display means comprises means for displaying said second portion as a partial overlap of said first portion such that said second plan view is at least partially superimposed upon said first plan view.

10. A system as in claim 2 wherein said control means controls said rotating means and said tilting means to rotate said antenna for a plurality of additional subsequent horizontal sweeps and said means for storing includes additional memory sections for storing returned pulses from said additional subsequent horizontal sweeps.

11. A system as in claim 10 wherein said display means comprises means for displaying additional portions representing returned pulses from said additional subsequent horizontal sweeps in a sequence of additional plan views.

12. A system as in claim 11 wherein said display means comprises means for displaying said first portion at least in part below said second portion and for displaying said additional portions at least in part above said second portion.

13. A weather radar display system comprising:
   an antenna for radiating pulses and for receiving returned pulses;
   means for housing said antenna;
   means for rotating said antenna within said housing means in a vertical direction for a vertical radar sweep;
   means for angularly displacing said antenna to reposition said antenna at a plurality of azimuth angles;
   control means for controlling said rotating means and said displacing means to rotate said antenna for a first vertical sweep at a first azimuth angle, to displace said antenna to a second azimuth angle and to subsequently rotate said antenna for a second vertical radar sweep at the second azimuth angle;
   means for storing returned pulses from said first and second vertical sweeps;
   said means for storing comprising a first memory section for storing returned pulses from said first vertical sweep and a separate second memory section for storing returned pulses from said second vertical sweep; and
   display means for displaying said return pulses stored in said first and second memory sections and wherein said display means comprises means for displaying a first portion representing said returned pulses stored in said first memory section and a second portion representing said returned pulses stored in said second memory section.

14. A system as in claim 13 wherein said control means includes means for controlling said display means to display said returned pulses stored in said first memory section as a first vertical plan view and to subsequently display said returned pulses stored in said second memory section as a second vertical plan view.

15. A system as in claim 14 wherein said control means includes means for controlling said display means to display said first and second plan views at the same time.

16. A system as in claim 15 wherein said display means comprises means for displaying said return pulses in said first vertical plan view in a first color.

17. A system as in claim 16 wherein said display means comprises means for displaying edge return pulses in said first vertical plan view in a second color different from said first color.

18. A system as in claim 15 wherein said display means comprises means for displaying said return pulses in said first vertical plan view in a single color having a first shade.

19. A system as in claim 18 wherein said display means comprises means for displaying edge return pulses in said first vertical plan view in a second shade different from said first shade.

20. A system as in claim 15 wherein said display means comprises means for displaying said return pulses in said second vertical plan view in a variety of colors to represent precipitation intensity.

21. A system as in claim 14 wherein said display means comprises means for displaying said second portion as a partial overlap of said first portion such that said second plan view is at least partially superimposed upon said first plan view.

22. A system as in claim 14 wherein said control means controls said rotating means and said displacing means to rotate said antenna for a plurality of additional subsequent vertical sweeps and said means for storing includes additional memory sections for storing returned pulses from said additional subsequent vertical sweeps.

23. A system as in claim 22 wherein said display means comprises means for displaying additional portions representing returned pulses from said additional subsequent vertical sweeps in a sequence of additional vertical plan views.

24. A system as in claim 23 wherein said display means comprises means for displaying said first portion at least partially to the left of said second portion and for displaying said additional portions at least partially to the right of said second portion.

25. A weather radar display method comprising:
radiating pulses from an antenna and receiving returned pulses;
rotating said antenna in a horizontal direction for a horizontal radar sweep;
tilting said antenna to reposition said antenna at a plurality of tilt angles;
controlling said antenna to rotate for a first horizontal sweep at a first tilt angle, to tilt said antenna to a second tilt angle and to subsequently rotate said antenna for a second horizontal radar sweep at said second tilt angle;
storing returned pulses from said first and second horizontal sweeps;
said storing step comprising storing returned pulses from said first horizontal sweep in a first memory section and storing returned pulses from said second horizontal sweep in a separate second memory section; and
displaying said returned pulses stored in said first and second memory sections and
wherein said displaying step includes displaying said returned pulses stored in said first memory section in a first display section and displaying said returned pulses stored in said second memory section in a second display section.

26. A method as in claim 25 including displaying said returned pulses stored in said first memory section as a first horizontal plan view and for subsequently displaying said returned pulses stored in said second memory section as a second horizontal plan view.

27. A method as in claim 26 including displaying said first and second plan views at the same time.

28. A method as in claim 27 including displaying said return pulses in said first horizontal plan view in a first color.

29. A method as in claim 28 including displaying edge return pulses in said first horizontal plan view in a second color different from said first color.

30. A method as in claim 27 including displaying said return pulses in said first horizontal plan view in a single color having a first shade.

31. A method as in claim 30 including displaying edge return pulses in said first horizontal plan view in a second shade different from said first shade.

32. A method as in claim 27 including displaying said return pulses in said second horizontal plan view in a variety of colors to represent precipitation intensity.

33. A method as in claim 26 including displaying said second display section as a partial overlap of said first display section such that said second plan view is at least partially superimposed upon said first plan view.

34. A method as in claim 26 including tilting and rotating said antenna means for a plurality of additional subsequent horizontal sweeps and storing returned pulses from said additional subsequent horizontal sweeps in additional memory sections.

35. A method as in claim 34 including displaying returned pulses from said additional subsequent horizontal sweeps in a sequence of additional horizontal plan views in additional display sections.

36. A method as in claim 35 including locating said first display section at least partially below said second display section and locating said additional display sections in one or more horizontal sections at least partially above said second display section.

37. A weather radar display method comprising:
radiating pulses from an antenna and receiving returned pulses;
housing said antenna in a housing means;
rotating said antenna within said housing means in a vertical direction for a vertical radar sweep;
shifting said antenna to reposition said antenna at a plurality of azimuth angles;
controlling said antenna to rotate for a first vertical sweep at a first azimuth angle, to shift said antenna to a second azimuth angle and to subsequently rotate said antenna for a second vertical radar sweep at the second azimuth angle;

storing returned pulses from said first and second vertical sweeps;

said storing step comprising storing returned pulses from said first vertical sweep in a first memory section and storing returned pulses from said second vertical sweep in a separate second memory section; and displaying said returned pulses stored in said first and second memory section and wherein said displaying step includes displaying said returned pulses stored in said first memory section in a first display section and displaying said returned pulses stored in said second memory section in a second display section.

38. A method as in claim 37 including displaying said returned pulses stored in said first memory section as a first vertical plan view and for subsequently displaying said returned pulses stored in said second memory section as a second vertical plan view.

39. A method as in claim 38 including displaying said first and second plan views at the same time.

40. A method as in claim 39 including displaying said return pulses in said first vertical plan view in a first color.

41. A system as in claim 40 including displaying edge return pulses in said first vertical plan view in a second color different from said first color.

42. A method as in claim 39 including displaying said return pulses in said first vertical plan view in a single color having a first shade.

43. A method as in claim 42 including displaying edge return pulses in said first vertical plan view in a second shade different from said first shade.

44. A method as in claim 39 including displaying said return pulses in said second vertical plan view in a variety of colors to represent precipitation intensity.

45. A method in claim 38 including displaying said second display section as a partial overlap of said first display section such that said second plan view is at least partially superimposed upon said first plan view.

46. A method as in claim 38 including shifting and rotating said antenna means for a plurality of additional subsequent vertical sweeps and storing returned pulses from said additional subsequent vertical sweeps in additional memory sections.

47. A method as in claim 46 including displaying returned pulses from said additional subsequent vertical sweeps in a sequence of additional vertical plan views in additional display sections.

48. A method as in claim 47 including locating said first display section at least partially to the left of said second display section and locating said additional display sections in one or more vertical sections at least partially to the right of said second display section.

49. A weather radar network system comprising:
an airborne radar system mounted in an aircraft;
at least one remote radar system;
said airborne radar system being operable to scan short range weather conditions ahead of the aircraft;
said remote radar system being operable to scan weather conditions at a geographic locale beyond the scanning range of said airborne radar system;
means for transmitting data obtained by said remote radar system to said aircraft; and
means for displaying data from said airborne radar system and from said remote radar system on said aircraft.

50. A system according to claim 49 wherein said airborne radar system includes:
an antenna for radiating pulses and for receiving returned pulses;
means for rotating said antenna for a horizontal sweep;
means for tilting said antenna to a plurality of tilt angles;
control means for controlling said rotating means and said tilting means to rotate said antenna for a first horizontal sweep at a first tilt angle, to tilt said antenna to a second tilt angle and rotate said antenna for a second horizontal sweep at said second tilt angle;
means for storing returned pulses from said first and second horizontal sweeps;
said means for storing comprising a first memory section for storing returned pulses from said first horizontal sweep and a separate second memory section for storing returned pulses from said second horizontal sweep; and wherein
said display means comprises means for displaying said returned pulses stored in said first and second memory sections.

51. A system according to claim 50 wherein said display means comprises means for displaying a first portion representing said returned pulses stored in said first memory section as a first horizontal plan view and a second portion representing said returned pulses stored in said second memory section as a second horizontal plan view.

52. A system according to claim 51 wherein said display means comprises means for displaying said second portion as a partial overlap of said first portion such that said second plan view is at least partially superimposed upon said first plan view.

53. A system according to claim 52 wherein said display means comprises means for displaying said first and second plan views sequentially.

* * * * *